United States Patent Office 3,546,960
Patented Dec. 15, 1970

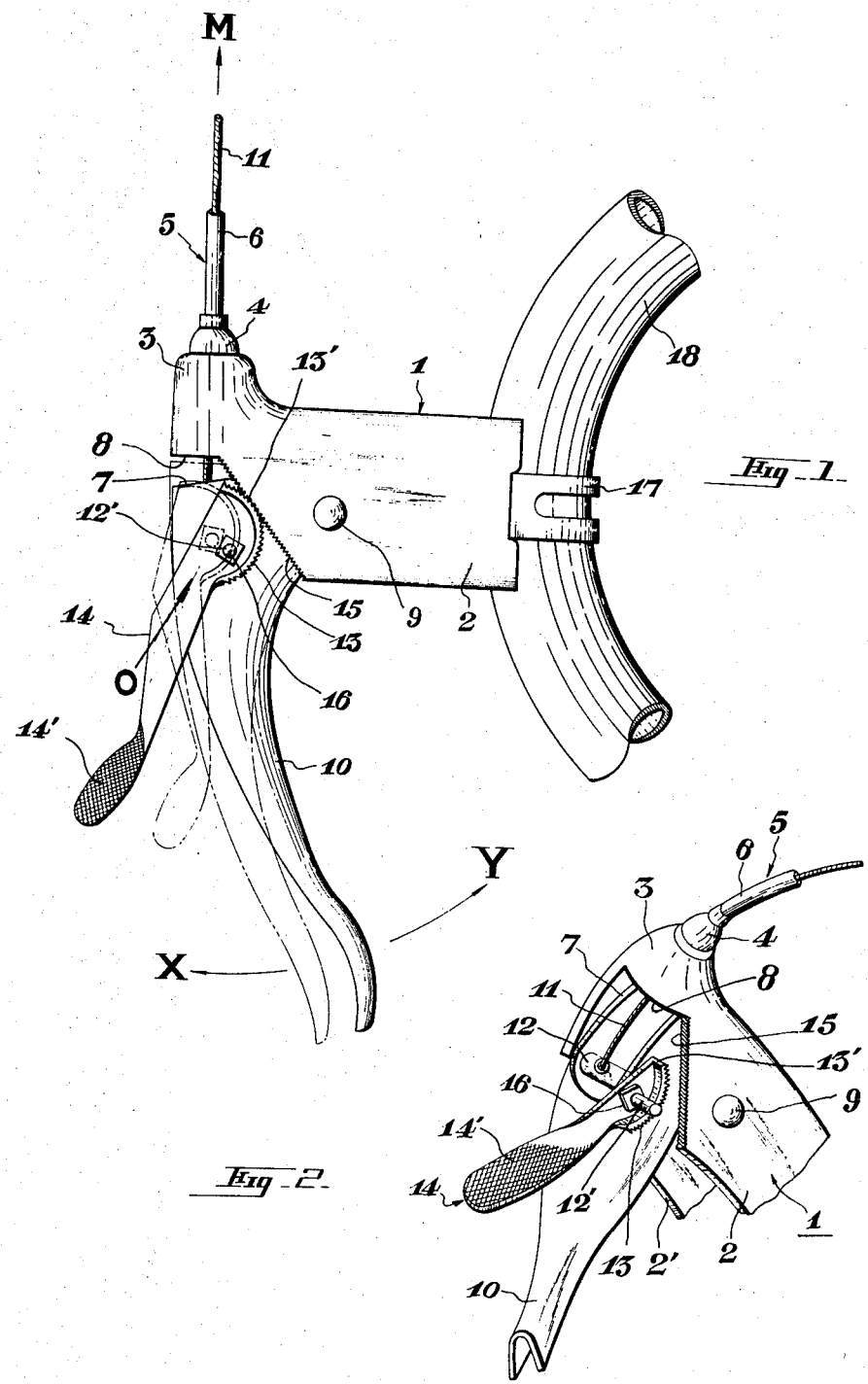

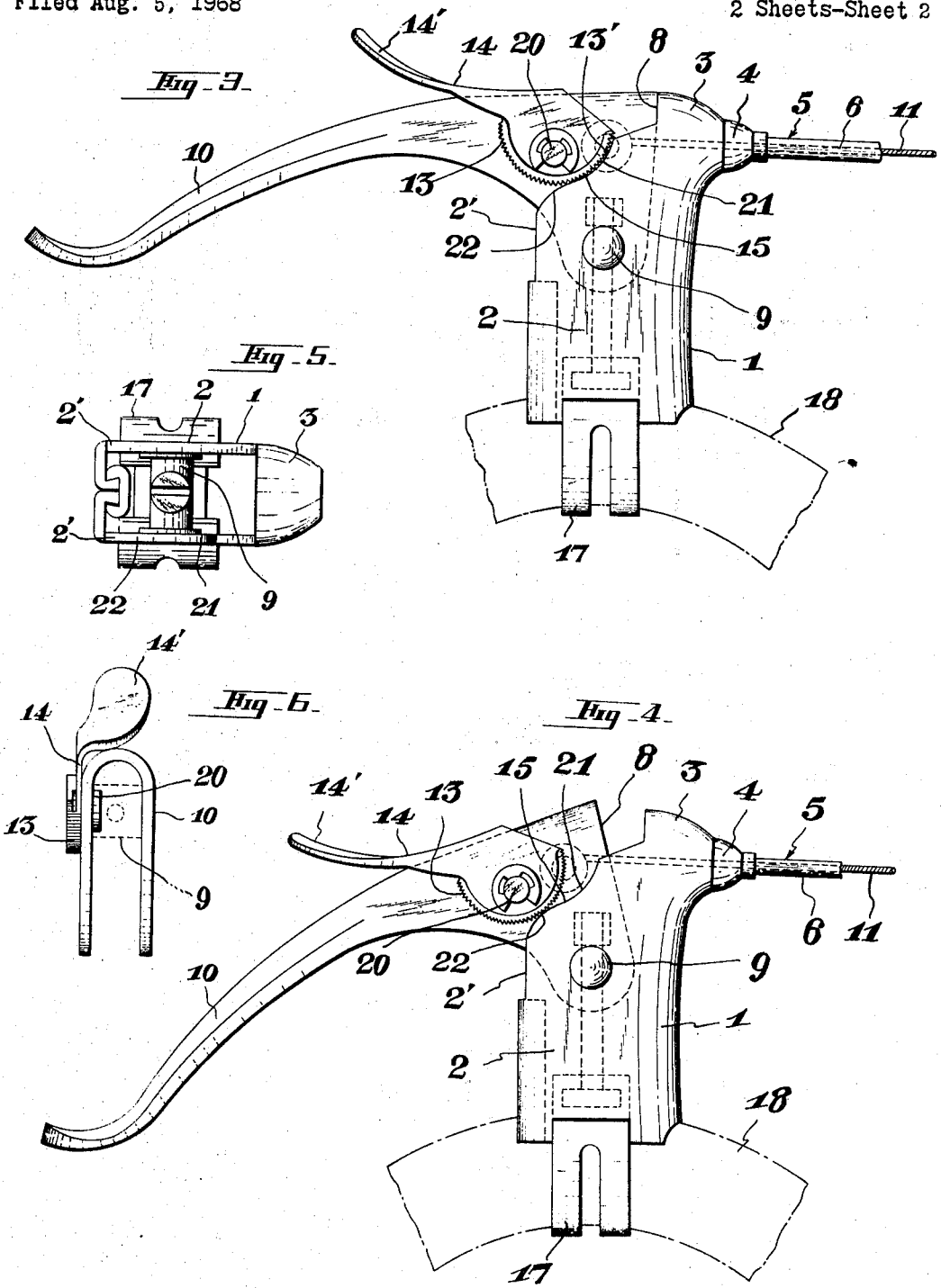

3,546,960
BICYCLE BRAKE
Saburo Masuda, 1110-212 Osakafueiharumiyajyutaku,
1828 Armoto, Higashi-Osaka-shi, Osaka-fu, Japan
Filed Aug. 5, 1968, Ser. No. 750,294
Claims priority, application Japan, Mar. 19, 1968,
43/21,687
Int. Cl. G05g 9/06
U.S. Cl. 74—489                           2 Claims

ABSTRACT OF THE DISCLOSURE

A bicycle brake comprises hand operable brake means having the usual lever member pivoted to a bracket secured to the handle bar. A locking member having an arcuated surface to engage the locking edge of the bracket is pivotally provided with the hand operable lever to enable the brake means to be in braked condition.

---

The present invention relates generally to a bicycle brake and more particularly to such braking system in which a manually operated braking lever positioned near the handle can be secured at its braking position, when so desired, by a simple locking member, thereby eliminating any necessity of constantly gripping the braking lever to maintain the braked condition during for instance riding along a long down slope, and instead, by simply moving the locking member to its locking position, the secure braking action can be maintained with no need of touching the braking lever thereafter, resulting in facilitation of safe bicycle manipulation and elimination or reduction of fatigue otherwise suffered during braking operation.

It is known that the braking system provided at the front wheel or rear wheel of a bicycle is generally actuated by a braking lever positioned near the handle and a flexible release wire connected to said lever and elastically supported by a spring or other means. This means that the rider must grip the braking lever, so as to pull the release wire to brake the bicycle, with the same hand that is gripping the handle to manipulate the bicycle. Therefore, when running, for example, along a long down slope or on such places where braking operation is needed, the cycler must always hold the braking lever with the same hand that is gripping the handle. However, the function of the braking lever is to force the release wire, which is normally pulled by a spring to keep the brake in release position, to be pulled in the braking direction against the force of spring, so that naturally strong force is required to overcome reversion of the spring. Thus gripping and pulling of the braking lever for a long time produces considerable fatigue in the cycler. Further, the handle manipulation must be suitably controlled according to the condition of the passage or to the presence of other vericles or pedestrians, and this may cause inadvertnt loosening of grip of the braking lever to make the vehicle run out of control. In general, for safe and sound handle manipulation responding to instantaneous change of situations, such simultaneous gripping of the braking lever for a long time poses various inconveniences, such as incessant stress and physical fatigue of the wheelman. No noticeable study or improvement has been made about such important problem inherent to this type of braking lever, and any available braking system is within the range of conventional type in which the braking lever is gripped to pull the release wire, and the cyclers have no alternative but to endure inconveniences met during cycling.

The present invention is designed to eliminate these defects. Namely, according to the present invention, there are provided a locking member and a locking section engageable with said locking member mounted at a part of the braking lever connected to one end of the release wire which actuates the braking members. Said locking member can be manipulated by a finger of the handle gripping hand to move and fix the braking lever at the braking position so that the braking lever, once set at its braking position, remains secured at its position as long as the rider wants, even if the rider lets go his hold of the lever. Thus, the present locking device can maintain a condition where the release wire is pulled by the braking lever into the braking position, whereby the rider can continue his cycling while keeping the braking system in the locked state as long as he desires without touching the braking lever. He can also easily restore the normal running condition by simply disengaging said locking member from the locking section. Thus the present device can not only eliminate possible fatigue and stress otherwise suffered by the cycler during long time braking operation and permit cheerful cycling since the cycler has only to concentrate on manipulation of the handle, but also improve safety and convenience in cycling, with additional positiveness of movement and almost no occurence of troubles owing to simplicity of the structure.

It is therefore an an object of the present invention to provide a braking system mounted on the handle within the easy access of the handle grip grasping hand, in which a bevelled or curved locking edge is formed at a part of the housing of a braking lever connected to an elastic release wire which actuates the bicycle braking members and in which a locking lever having an arcuate face engaged with said locking edge on said braking lever is rotatably pivoted on the extension of a connecting pin of said release wire.

It is another object of the present invention to provide a braking system mounted on the handle within the easy access of the handle grip grasping hand, in which a bevelled or curved locking edge is formed at a part of the housing of a braking lever connected to an elastic release wire which actuates the bicycle braking members and in which a locking lever having an arcuate face engaged with said locking edge on said braking lever is rotatably pivoted at a position dfferent from that of a connecting pin of said release wire.

The present invention will now be explained in more detail by way of several examples of its typical embodiments with reference to the accompanying drawings, in which:

FIG. 1 is a front view of an embodiment where the locking lever is pivotally secured on the extension of the release wire connecting pin of the operating lever (braking lever);

FIG. 2 is a perspective view of the principal parts thereof;

FIG. 3 is a front view of another embodiment where the locking lever is pivotally secured at a position other than that of the release wire connecting pin of the operating lever;

FIG. 4 is a front view showing the embodiment of FIG. 3 in locked condition;

FIG. 5 is a plane view of a housing thereof; and

FIG. 6 is a front view of the locking lever.

Referring to FIGS. 1 and 2, a lever housing 1 has a casing wall 2 which has provided at an end thereof a projected portion 3, and at the protruded end of said projected portion 3 is fitted through a detent member 4 an outer wire 6 of a release wire 5 connected to the braking members provided at a side of a wheel or wheels of the bicycle to effect braking and releasing operation. Between the upper flanges 2', 2' constituting the upper part of the casing wall 2 is pivotally mounted an operat-lever 10 through a pivot 9 so that the edge 7 thereof is abutted to the rear recesses face 8 of the projected portion 3. At a part of this lever 10 is mounted a pin shaft 12' to which the terminal end of an inner wire 11 is secured, and said shaft 12' is extended outward from one side of said operating lever 10. There is also provided a locking lever 14 of which one side is bent acuately and which has at its other end an arcuated face 13 having indentations meshed with a knurling tool. This lever 14 is arranged such that when it was moved in the returning direction of the operating lever 10 (X-indicated direction in FIG. 1), the end portion 13' of the arcuated face 13 is abutted to a locking edge 15 having indentations, such as a knurling tool, formed between the projection 3 and on one of the flanges 2'. The locking lever 14 is also eccentrically pivoted through a washer 16 to a protruded portion 12' of said pin shaft 12' extended at one side of the operating lever 10 so that when the lever 14 was moved in the opposite direction to let the rear operating part 14' of the locking lever 14 about on the operating lever 10. the arcuated face 13 will move away from said locking edge 15. In the figures, 17 is a fastening band for securing the housing 1 to the handle 18, and 19 is a stem.

Shown in FIGS. 3 to 6 is an embodiment in which the locking lever 14 is pivotally secured at a part of the operating lever 10 at a position spaced from the pin shaft 12, unlike in the embodiment of FIG. 1 wherein the locking lever 14 is secured at the protruded portion 12' of the fastening pin shaft 12. The like signs show the like parts in all figures. In this embodiment, said locking lever 14 is rotatably secured by another pivot 20 on the operating lever 10 at a position in the rear of the pin shaft 12. Also, in this embodiment, the locking edge 15 is formed of a substantially S-shaped curve comprising a concave face 21 at the front stage and a convex face 22 at the rear stage, and when the braking system is not worked, the arcuate face 13 engages the concave face 21, while when said system is locked, said face 13 engages the convex face 22.

Now the operation of the present invention will be discussed with respect to the embodiment shown in FIGS. 1 and 2. When, for example, a cycler came across a down slope and wants to put on the brake continuously to continue reduced running with certain degree of braking operation being worked, he grips and jerks the operating lever 10 (in the Y-indicated direction) towards the handle 18 to draw the inner wire 11 towards the housing 1, thereby suitably controlling the running speed of the bicycle, and then, while keeping the operating lever 10 in the gripped condition, he pushes by a finger, preferably a forefinger, the operating portion 14' of the locking lever 14 in the returning (X-indicated) direction of the operating lever 10 as shown by the solid line, thus permitting the arcuate face 13 of the locking lever 14 eccentrically pivoted to the projected end 12' of the shaft 12 to come close to the locking edge 15 formed adjacent one side wall 2' until the end portion 13' of said arcuate face 13 engages said locking edge 15. at which instance the cycler stops pushing the portion 14' and at the same time releases grip of the lever 10. The return movement of the grip-released lever 10 in the returning (X-indicated) direction by elastic restoring tendency (in the M-indicated direction) of the inner wire 11 due to pulling force of the spring is inhibited by engagement of the arcuate face 13 of the locking lever 14 pivoted at one side of the lever 10 and the locking edge 15 adjacent the upper side wall 2'. Thus the operating lever 10 is constantly maintained in a braked condition, so that the cycler, with no need of gripping the operating lever 10, can continue his cycling safely under a suitably braked and reduced condition along a down slope. It will be obvious that the same function and effect are produced in the embodiment shown in FIGS. 3 to 6.

As evident from the foregoing embodiments, when it is desired to continue riding while maintaining a braked condition by operating the braking lever according to the situation for a certain period, there is no need to constantly strongly grip the braking lever with the same hand that is gripping the handle, so that light-hearted and safe cycling with eased handle manipulation is assured and also the cycler is released from fatigue and mental strain. The present invention is particularly advantageous for its simplicity in mechanism wherein it suffices to pivotally mount a locking lever 14 at one side of an operating lever 10, or a braking lever, and to form a locking edge 15 at a part of a housing 1, with an arcuate face 13 being formed on the locking lever 14. When the operating lever 10 is rotated with the pivot 9 as its fulcrum by elastic restoring force of the inner wire 11, the arcuate face 13 of the locking lever 14 is meshed fast with the locking edge 15 due to strong tendency of the lever 14 to rotate in the same direction as the lever 10, so that the locking action is secure and powerful thanks to the interrelation of action and reaction.

Therefore, while riding along a long downhill, the cycler feels no fatigue which may otherwise be produced for gripping the operating lever 10 for a long time with a considerably strong force as necessitated in the conventional bicycles. The only operation needed in the present invention is to manipulate the locking lever with a finger of the hand that is holding the handle grip, so that anyone can easily operate the system. Further, in case a perfect braking action is required for sudden stop or in other emergency during reduced braked running, the cycler has only to strongly grasp the operating lever 10, so that he can evade accident or other danger. When it is desired to release locking of the braking system, the cycler has only to jerk the locking lever 14 with a finger towards the handle, whereby the arcuate face 13 is disengaged from the locking edge 15, permitting the operating lever 10 to automatically return together with the wire 11 to its open position. In any case, the present invention remarkably improves the conventional braked running of a bicycle and eliminates unreasonableness which produces undesirable physical fatigue and mental strain. It is to be understood that changes and modifications in design considerable in practicing the present invention stay within the scope of the present invention.

What is claimed is:

1. A manually locable hand brake actuating mechanism for a bicycle, comprising:
   (a) a mounting member adapted to be mounted on the handle bar of a bicycle adjacent the hand grip and having a toothed edge,
   (b) hollow guide means on the mounting member outward from the handle bar for slideably receiving a brake cable,
   (c) a brake level pivotally mounted on the mounting member for rotation in a plane substantially including the handle bar,
   (d) a connecting pin mounted on the brake lever substantially aligned with the hollow guide means and attached to the brake cable, and
(e) an unbiased locking level freely pivoted to the brake lever for rotation in a plane substantially including the handle bar and having a curved toothed edge adapted to be brought into locking engagement with the toothed edge of the mounting member upon rotation,
(f) the pivot of the locking lever being located between the curved toothed edge and the center of curvature thereof.

2. A hand brake actuating mechanism as defined in claim 1 wherein the pivot of the locking lever is coextensive with the connecting pin.

References Cited

UNITED STATES PATENTS

| | | | |
|---|---|---|---|
| 270,107 | 1/1883 | Parrin | 74—526X |
| 1,385,546 | 7/1921 | Hodges | 248—355 |
| 2,672,061 | 3/1954 | Gardner | 74—530 |
| 2,731,857 | 1/1956 | Marino | 74—489X |
| 2,824,463 | 2/1958 | Gleasman et al. | 74—489 |

FOREIGN PATENTS

| | | | |
|---|---|---|---|
| 1,513 | 1906 | Great Britain | 74—489 |
| 20,208 | 1900 | Great Britain | 74—489 |
| 26,950 | 1903 | Great Britain | 74—489 |
| 272,138 | 5/1949 | Switzerland | 74—489 |

WESLEY S. RATLIFF, JR., Primary Examiner